(12) United States Patent
Koiso

(10) Patent No.: US 12,416,969 B2
(45) Date of Patent: Sep. 16, 2025

(54) DISPLAY DEVICE, DISPLAY METHOD, AND COMPUTER-READABLE STORAGE MEDIUM

(71) Applicant: JVCKENWOOD Corporation, Yokohama (JP)

(72) Inventor: Hisashi Koiso, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 18/818,653

(22) Filed: Aug. 29, 2024

(65) Prior Publication Data

US 2024/0419241 A1  Dec. 19, 2024

Related U.S. Application Data

(63) Continuation of application No. PCT/JP2023/006109, filed on Feb. 21, 2023.

(30) Foreign Application Priority Data

Mar. 2, 2022 (JP) .................................. 2022-031816
Mar. 2, 2022 (JP) .................................. 2022-031817

(51) Int. Cl.
  *G06F 3/01*    (2006.01)
  *G06T 3/40*    (2024.01)
  *G06T 3/60*    (2024.01)

(52) U.S. Cl.
  CPC .............. *G06F 3/012* (2013.01); *G06F 3/013* (2013.01); *G06T 3/40* (2013.01); *G06T 3/60* (2013.01)

(58) Field of Classification Search
  CPC .. G06F 3/0481; G06F 3/0485; G06F 3/04897; G06F 3/04845; G09G 5/38;
  (Continued)

(56) References Cited

U.S. PATENT DOCUMENTS 7,724,296 B2 *  5/2010  Lonn .................... G06V 10/242
                                                          348/333.12
8,593,558 B2 * 11/2013  Gardiner ................ H04N 23/63
                                                          348/333.12

(Continued)

FOREIGN PATENT DOCUMENTS

JP  2005-266061    9/2005
JP  2011-041067    2/2011
(Continued)

OTHER PUBLICATIONS

International Search Report and Written Opinion for International Application Serial No. PCT/JP2023/006109 mailed on May 9, 2023, 9 pages.

(Continued)

*Primary Examiner* — Benyam Ketema

(74) *Attorney, Agent, or Firm* — Amin, Turocy & Watson, LLP

(57) ABSTRACT

A display device includes a display unit; a face angle detector configured to detect a face angle that is an angle between the display unit and a face of a user; and a display controller configured to adjust an angle of display of a subject of display by rotating the subject of display on a reference position on the display unit according to a result of detecting the face angle.

10 Claims, 14 Drawing Sheets

(58) Field of Classification Search
CPC .......... G09G 2340/04; G09G 2354/00; G09G 5/373; G09G 5/37
See application file for complete search history.

(56) References Cited

U.S. PATENT DOCUMENTS

| | | | | |
|---|---|---|---|---|
| 8,743,021 | B1* | 6/2014 | Park | G06F 3/013 |
| | | | | 345/1.3 |
| 9,164,582 | B2* | 10/2015 | Seki | H04N 21/4725 |
| 9,230,184 | B2* | 1/2016 | Sugimoto | G06V 10/242 |
| 10,545,574 | B2* | 1/2020 | George-Svahn | G06F 3/02 |
| 2005/0104848 | A1* | 5/2005 | Yamaguchi | G06F 1/1626 |
| | | | | 345/156 |
| 2005/0234324 | A1* | 10/2005 | Sugimoto | H04N 23/611 |
| | | | | 600/407 |
| 2007/0292019 | A1* | 12/2007 | Terakawa | G06V 10/242 |
| | | | | 382/118 |
| 2009/0245634 | A1* | 10/2009 | Matsuzaka | G06V 40/175 |
| | | | | 382/167 |
| 2011/0037866 | A1* | 2/2011 | Iwamoto | G06F 3/012 |
| | | | | 348/222.1 |
| 2012/0057064 | A1* | 3/2012 | Gardiner | H04N 23/61 |
| | | | | 348/E5.022 |
| 2012/0229373 | A1* | 9/2012 | Kogane | G09G 5/36 |
| | | | | 345/156 |
| 2013/0137483 | A1* | 5/2013 | Senoo | G09G 5/00 |
| | | | | 455/556.1 |
| 2013/0176341 | A1* | 7/2013 | Jung | G09G 5/38 |
| | | | | 345/649 |
| 2013/0222271 | A1 | 8/2013 | Alberth et al. | |
| 2014/0140609 | A1* | 5/2014 | Krishnaswamy | G06T 3/608 |
| | | | | 382/199 |
| 2015/0235347 | A1* | 8/2015 | Oizumi | G09G 5/00 |
| | | | | 345/659 |
| 2018/0374456 | A1 | 12/2018 | Mu | |
| 2019/0172271 | A1 | 6/2019 | Yasuda et al. | |
| 2020/0234495 | A1* | 7/2020 | Nakao | A63F 13/5258 |
| 2021/0149441 | A1* | 5/2021 | Bartscherer | G06F 1/1616 |
| 2023/0419490 | A1* | 12/2023 | Koiso | G06T 7/0012 |
| 2024/0251154 | A1* | 7/2024 | Takao | H04N 23/61 |

FOREIGN PATENT DOCUMENTS

| | | |
|---|---|---|
| JP | 2015-513711 | 5/2015 |
| JP | 2015-167010 | 9/2015 |

OTHER PUBLICATIONS

Extended European Search Report for European Patent Application No. 23763307.8 dated Mar. 28, 2025.

* cited by examiner

FIG.10
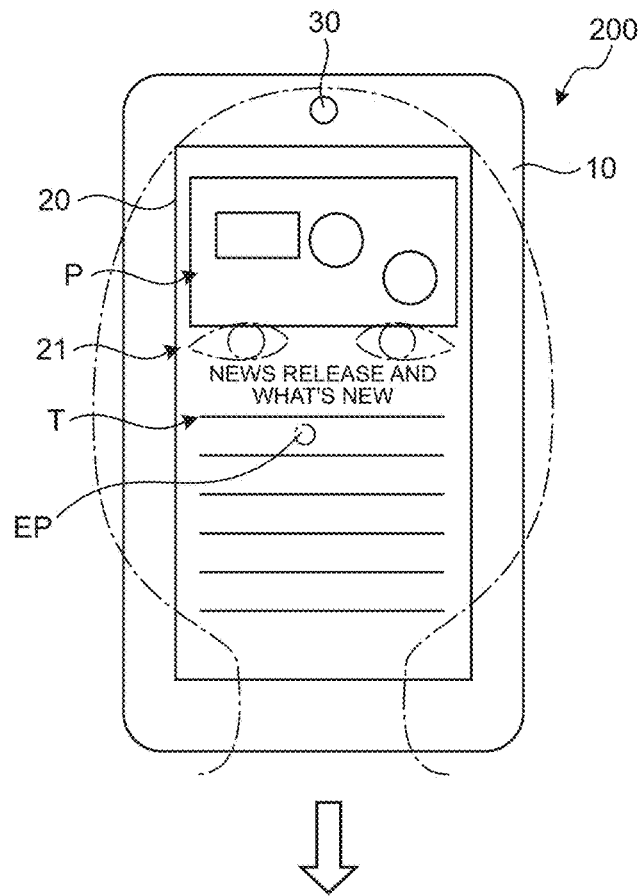
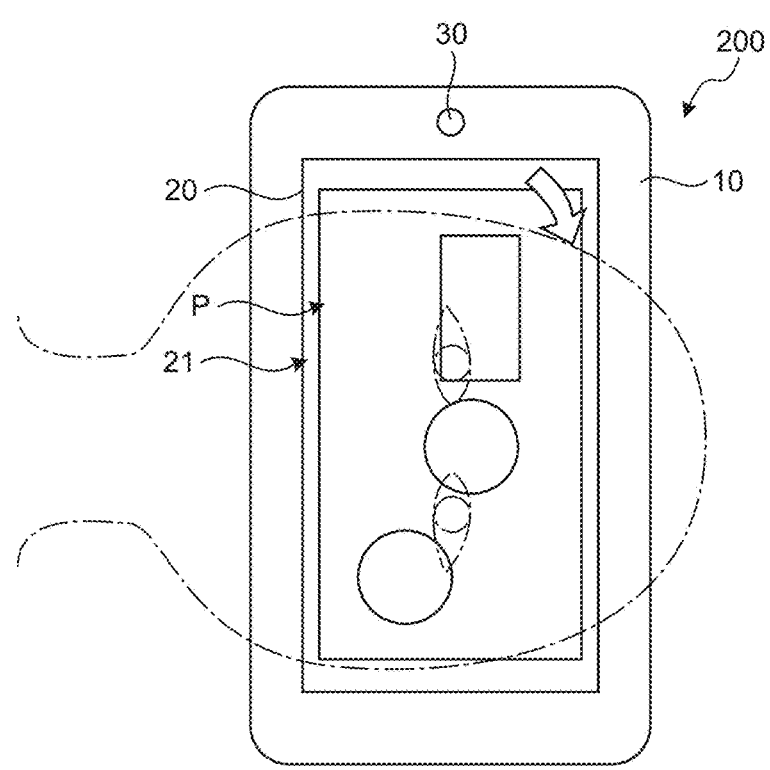

FIG.11
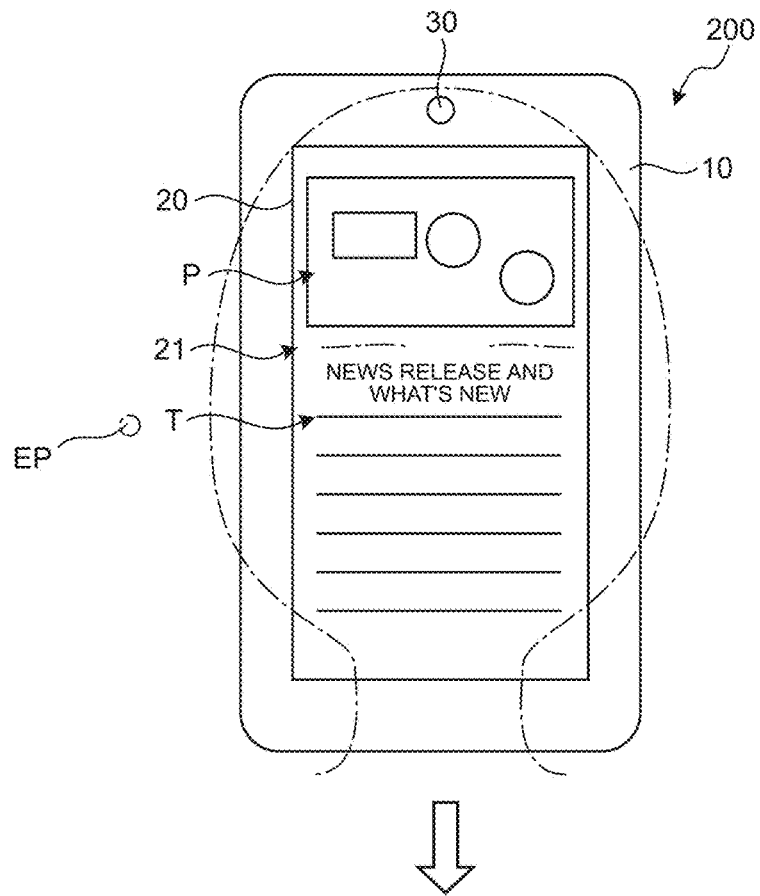
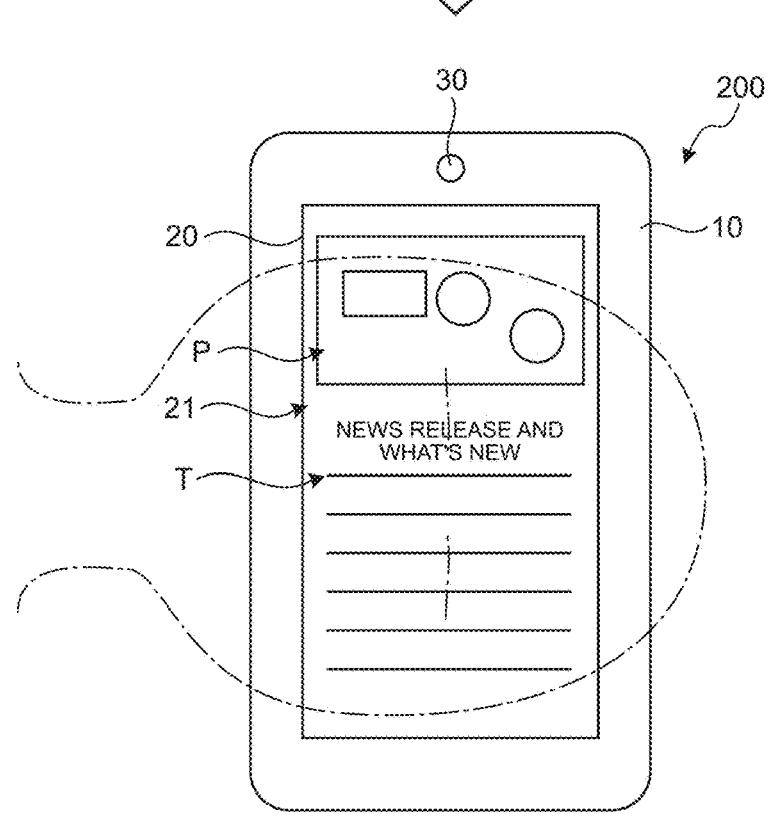

FIG.12
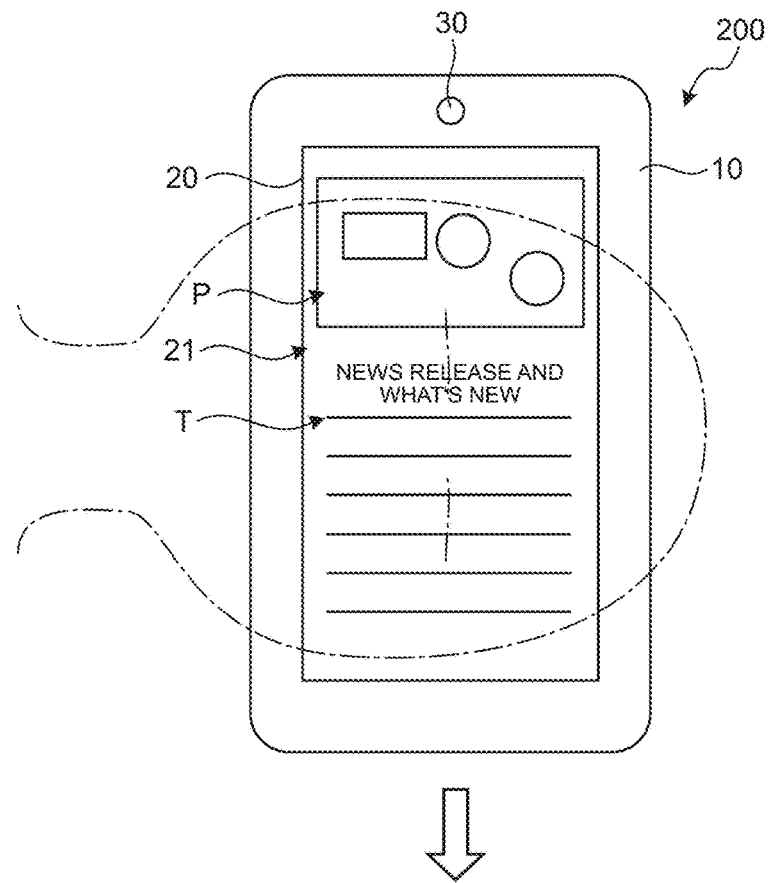
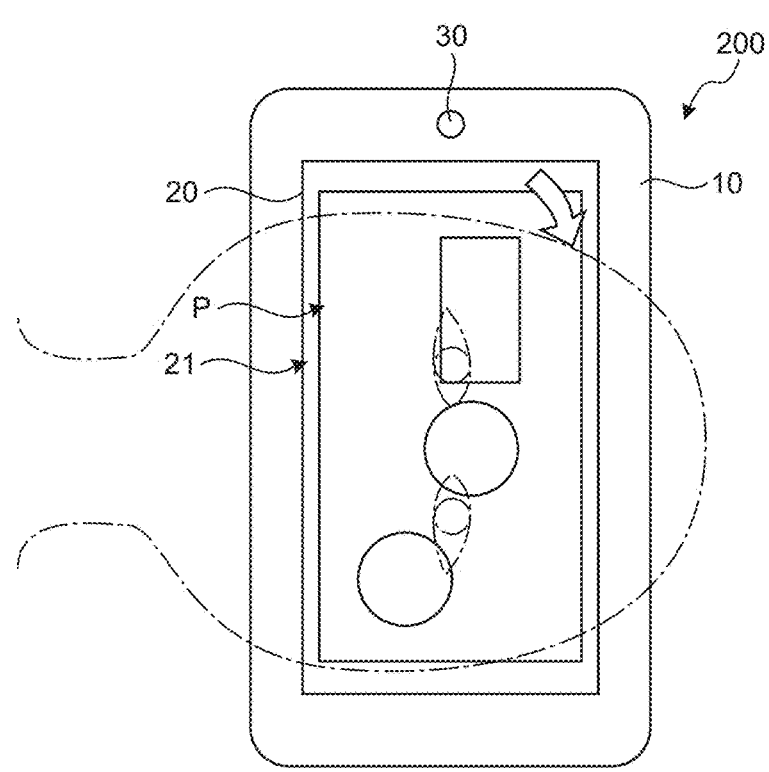

FIG.13

| SUBJECT OF DETECTION | CONTENT OF CONTROL |
|---|---|
| OPEN EYELIDS AFTER CLOSING EYELIDS FOR FIRST PERIOD | SET INITIAL VALUE OF ANGLE OF DISPLAY |
| OPEN EYELIDS AFTER CLOSING EYELIDS FOR SECOND PERIOD | CANCEL SETTING OF INITIAL VALUE OF ANGLE OF DISPLAY |
| GAZE ON UPPER PART OF DISPLAY UNIT BLINKING FOR FIRST NUMBER OF TIMES | SCROLL UP BY HALF OF SCREEN |
| GAZE ON LOWER PART OF DISPLAY UNIT BLINKING FOR FIRST NUMBER OF TIMES | SCROLL DOWN BY HALF OF SCREEN |
| GAZE ON UPPER PART OF DISPLAY UNIT BLINKING FOR SECOND NUMBER OF TIMES | SCROLL UP BY ONE SCREEN |
| GAZE ON LOWER PART OF DISPLAY UNIT BLINKING FOR SECOND NUMBER OF TIMES | SCROLL DOWN BY ONE SCREEN |
| SHIFT GAZE TO NEXT ROW OF TEXT | SCROLL LINE BY LINE IN ROW DIRECTION |
| NUMBER OF BLINKS PER UNIT OF TIME OR LENGTH OF TIME PER BLINK EXCEEDS THRESHOLD | ADJUST LUMINANCE OF DISPLAY UNIT |
| WHEN WALK IS DETECTED, GAZE IS PRESENT ON DISPLAY UNIT | DISPLAY ALERT OR TURN OFF DISPLAY |

DISPLAY DEVICE, DISPLAY METHOD, AND COMPUTER-READABLE STORAGE MEDIUM

CROSS-REFERENCE TO RELATED APPLICATIONS

This application is a Continuation of International Application No. PCT/JP2023/006109, filed on Feb. 21, 2023, which designates the United States, incorporated herein by reference, and which claims the benefit of priority from Japanese Patent Application Nos. 2022-031816 and 2022-031817 each filed on Mar. 2, 2022, the entire contents of both of which are incorporated herein by reference.

BACKGROUND

The present disclosure relates to a display device, a display method, and a computer-readable storage medium.

A display device that rotates a subject of display according to an angle between a display unit and the face of a user has been known (for example, refer to Japanese Laid-open Patent Publication No. 2015-167010).

In the display device described in Patent Literature 1, when a subject of display is rotated, a part that a user is looking at right before the rotation sometimes is not displayed in an appropriate position. Furthermore, the subject of display sometimes rotates at the time when the user is not looking at the display unit, for example, in the case where the user has his/her eyes closed, the case where the user is looking away from the display unit, or the like. In this case, there is a possibility that the user may be given with uncomfortableness. For this reason, a configuration for performing an operation of rotating the subject of display appropriately is required.

SUMMARY

A display device according to the present disclosure includes: a display unit; a face angle detector configured to detect a face angle that is an angle between the display unit and a face of a user; and a display controller configured to adjust an angle of display of a subject of display by rotating the subject of display on a reference position on the display unit according to a result of detecting the face angle.

A display method according to the present disclosure includes: detecting a face angle that is an angle between a display unit and a face of a user; detecting a gaze of the user; and adjusting an angle of display of a subject of display by rotating the subject of display on a reference position on the display unit according to a result of detecting the face angle.

A non-transitory computer-readable storage medium stores a display program causing a computer to execute: detecting a face angle that is an angle between a display unit and a face of a user; detecting a gaze of the user; and adjusting an angle of display of a subject of display by rotating the subject of display on a reference position on the display unit according to a result of detecting the face angle.

BRIEF DESCRIPTION OF THE DRAWINGS

FIG. 10 is a diagram illustrating an example of a display method according to the second embodiment;

FIG. 11 is a diagram illustrating an example of the display method according to the second embodiment;

FIG. 12 is a diagram illustrating an example of the display method according to the second embodiment;

FIG. 13 is a diagram illustrating an example of a relationship between a subject of detection that is a gaze and an eyelid open/close motion of the user and content of control on the display in the case where the subject of detection is detected.

DETAILED DESCRIPTION

An embodiment of a display device, a display method, and a display program according to the present disclosure will be described below based on the drawings. Note that the embodiment does not limit the invention. The components in the following embodiment contains ones that are replaceable easily by those skilled in the art or ones that are substantially the same.

First Embodiment

Figure 1:
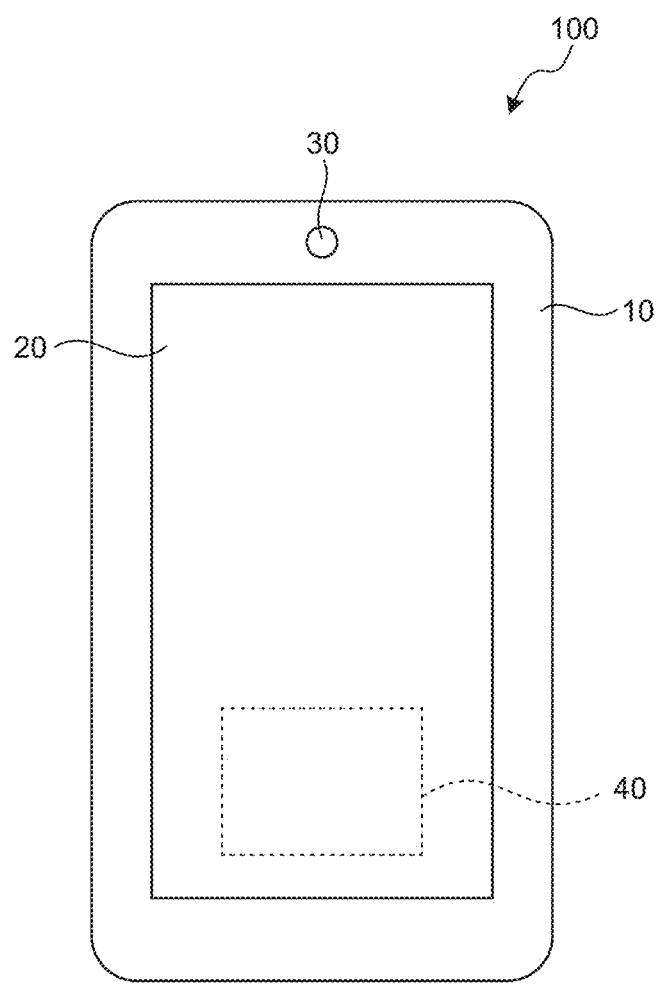
FIG. 1 is a schematic diagram illustrating an example of a display device according to a first embodiment.
Figure 2:
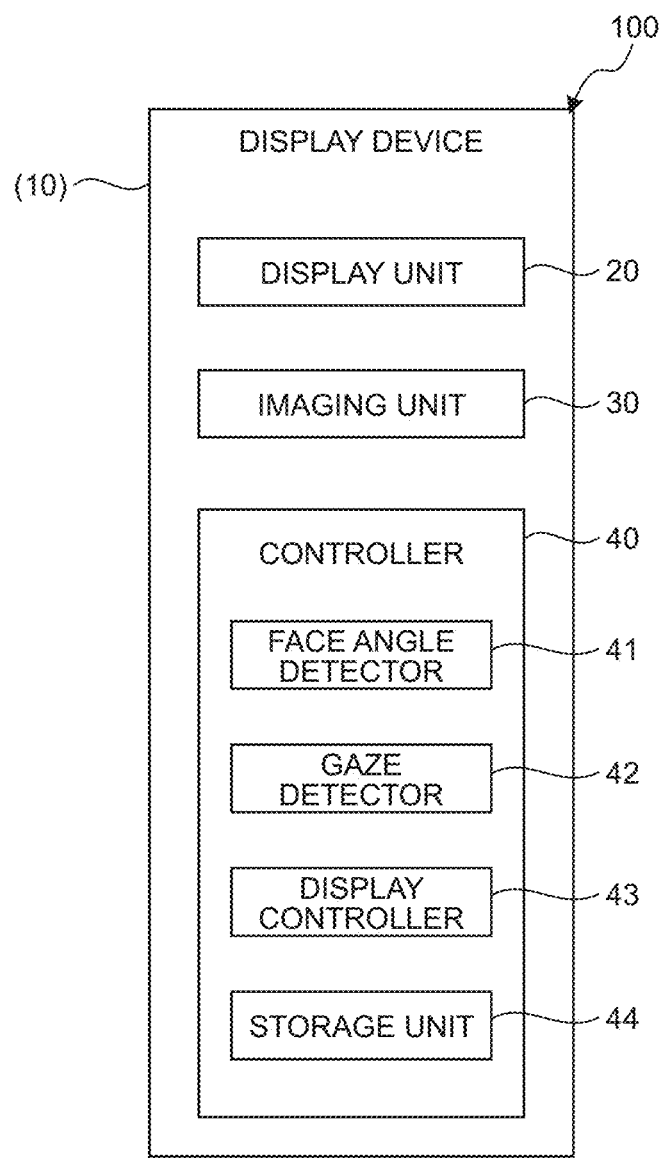
FIG. 2 is a functional block diagram illustrating an example of the display device according to the first embodiment.

FIG. 1 is a schematic diagram illustrating an example of a display device 100 according to a first embodiment. FIG. 2 is a functional block diagram illustrating an example of the display device 100 according to the first embodiment. As illustrated in FIG. 1, the display device 100 includes a casing 10, a display unit 20, an imaging unit 30, and a controller 40. The display device 100, for example, may be a portable information terminal device, such as a smartphone or a tablet.

The casing 10 holds the display unit 20, the imaging unit 30, and the controller 40. The casing 10, for example, may be provided with an acceleration sensor that is not illustrated in the drawings and that is capable of detecting walking by the user.

The display unit 20 is capable of displaying image information, such as a still image or a video, and text information, such as characters. For example, a display, such as a liquid crystal panel, is used as the display unit 20. For the display unit 20, a given reference direction that is used when a face angle to be described below is detected is set. For example, when the display unit 20 is rectangular, the reference direction can be one of two sides orthogonal to each other.

The imaging unit 30 is capable of capturing an image of the face and the eyes of the user. For example, a camera that is attached to the casing 10, or the like, is taken as the imaging unit 30. The imaging unit 30 generates imaging data by capturing an image of the face and the eyes of the user. The imaging unit 30 transmits the imaging data to the controller 40. A plurality of the imaging units 30 may be provided.

The controller 40 generally controls operations of the display device 100. The controller 40 includes a processing device, such as a CPU (Central Processing Unit), and a storage device, such as a RAM (Random Access Memory) or a ROM (Read Only Memory). The controller 40 includes a face angle detector 41, a gaze detector 42, a display controller 43, and a storage unit 44.

The face angle detector 41 detects a face angle that is an angle between the display unit 20 and the face of the user based on the imaging data that is generated by the imaging unit 30. The face angle detector 41 detects a center line in a width direction in an area from the forehead of the user to the tin and detects an angle between the center line and a reference direction of the display unit 20 as a face angle. The face angle is a value presenting the relative angle between the reference direction of the display unit 20 and a center line direction of the face of the user. The face angle is a value presenting a difference in a position of rotation on an axial direction (rolling direction) of a center axis perpendicular to the display unit 20. Because at least one of the reference direction of the display unit 20 and the center line direction of the face of the user changes and accordingly the face angle changes. Note that the face angle detector 41 may set a line connecting the centers of the right and left eyes of the user as the center line direction.

The gaze detector 42 detects a gaze of the user based on the imaging data that is generated by the imaging unit 30. The gaze detector 42, for example, may be configured to detect a gaze based on a position of a pupil of the user and a positon of a corneal reflection image or may be configured to detect a gaze based on a position of an inner corner of an eye of the user and a positon of an iris.

The display controller 43 controls a display operation in the display unit 20. The display controller 43 adjusts an angle of display of the subject of display by rotating the subject of display on a reference position on the display unit 20 according to the result of detecting the face angle. When the face angle is at or larger than a threshold, the display controller 43 is able to rotate the subject of display. When the gaze of the user is detected on the display unit 20, the display controller 43 sets, for the reference position, the position corresponding to the gaze.

The display controller 43 determines whether the subject of display contains text information and, when it is determined that it contains text information, determines whether the gaze of the user is present in a part of display of the text information. When it is determined that the gaze of the user is present in a part of display of the text information, the display controller 43 sets, for the reference position, a center of the text information on which the gaze is present in the row direction.

The display controller 43 is able to adjust the size of the subject of display so that all the text information that is displayed on the display unit 20 right before the rotation is displayed, and rotate the subject of display. When part of the text information is displayed in an enlarged manner right before the rotation, the display controller 43 is able to adjust the size of the subject of display so that the whole text information in the row direction is displayed, and rotate the subject of display.

The storage unit 44 stores various types of information. The storage unit 44, for example, has a storage, such as a hard disk drive or a solid state drive. An external storage medium, such as a removable disk, may be used as the storage unit 44.

The storage unit 44 stores a display program that causes a computer to execute a process of detecting a face angle that is an angle between the display unit 20 and the face of a user, a process of detecting a gaze of the user, and a process of adjusting an angle of display of a subject of display by rotating the subject of display on a reference position on the display unit 20 according to a result of detecting the face angle. The storage unit 44 stores a display program that causes a computer to execute a process of detecting a face angle that is an angle between the display unit 20 and the face of a user, a process of detecting a gaze of the user, and a process of adjusting an angle of display of a subject of display by rotating the subject of display on a reference position on the display unit 20 according to a result of detecting the face angle and setting, for the reference position, a position corresponding to the gaze when the gaze of the user is detected on the display unit 20.

Figure 3:
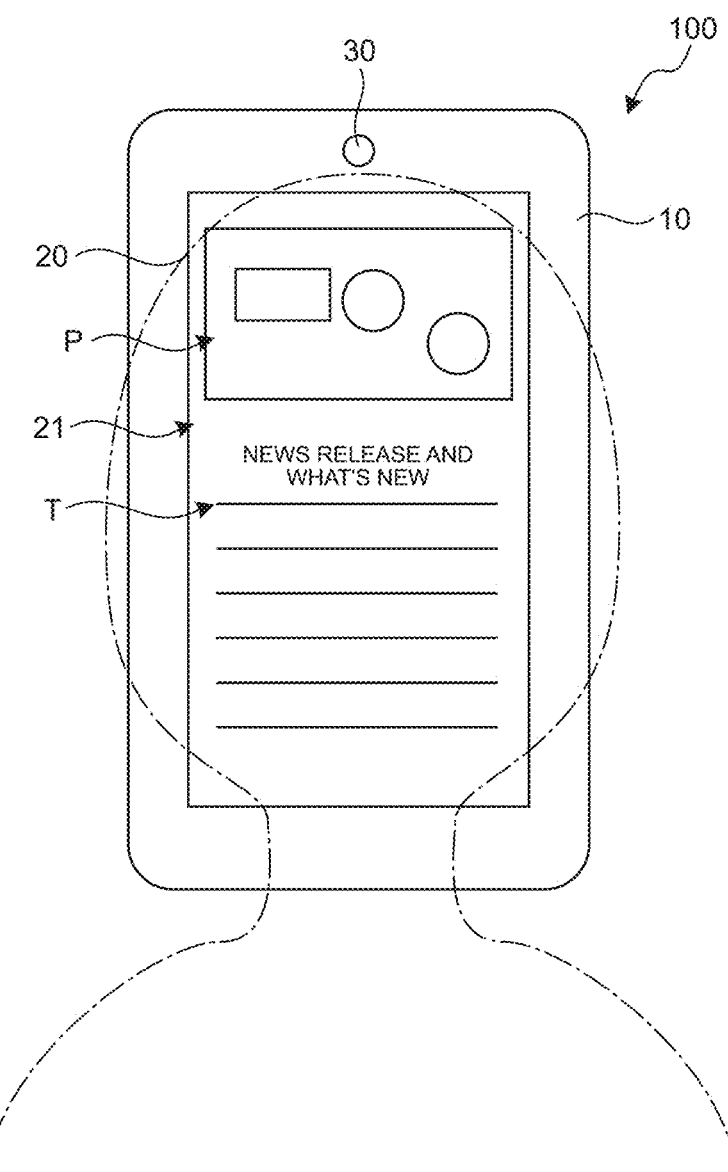
FIG. 3 is a diagram illustrating an example of a display method according to the first embodiment.

An example of a display method in the display device 100 described above will be described next. FIGS. 3 to 7 are diagrams illustrating an example of the display method according to the first embodiment. As illustrated in FIG. 3, the display controller 43 displays a subject-of-display 21 on the display unit 20. The user is able to view the subject-of-display 21 that is displayed on the display unit 20. The subject-of-display 21, for example, contains image information P, text information T, etc.

The imaging unit 30 captures an image of the face and the eyes of the user who looks at the display unit 20. The imaging unit 30 generates imaging data obtained by capturing the face and the eyes of the user and transmits the imaging data to the controller 40. In the controller 40, the face angle detector 41 detects a face angle of the user based on the imaging data. The gaze detector 42 detects a gaze of the user based on the imaging data.

Figure 4:
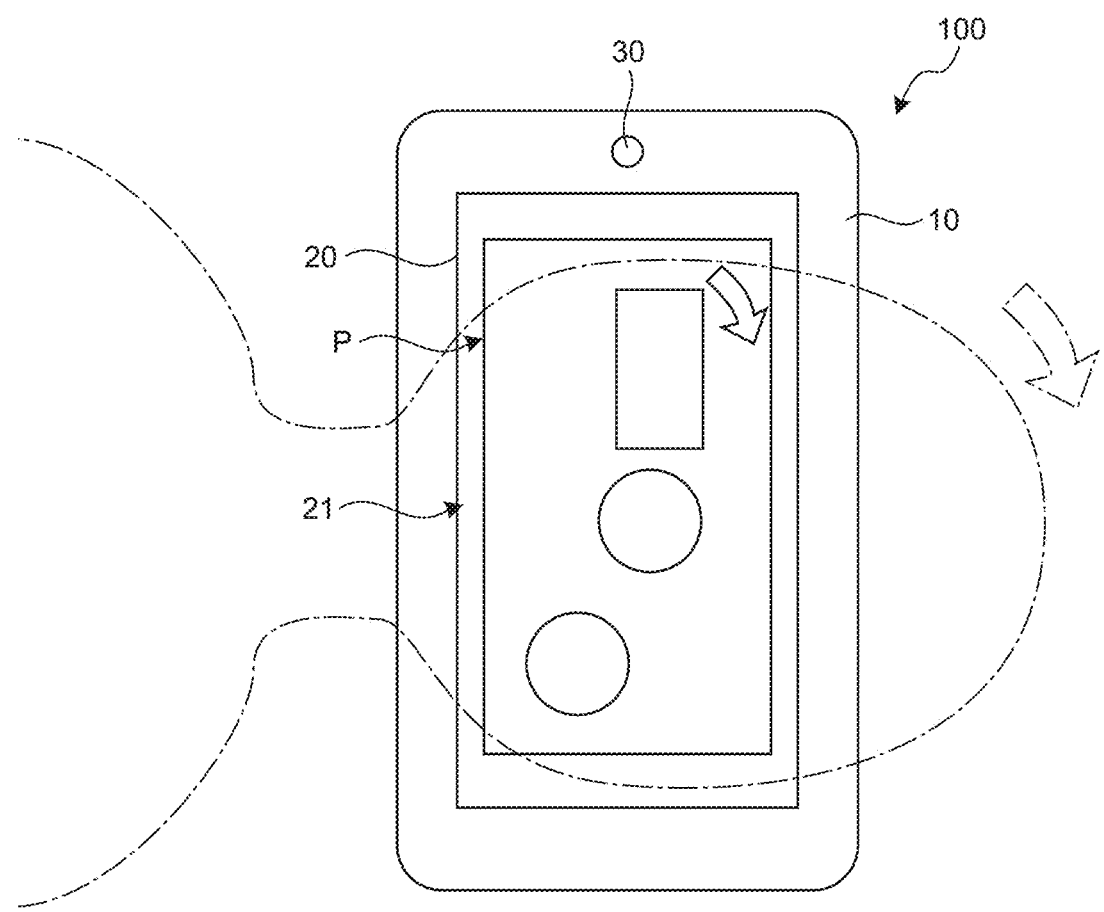
FIG. 4 is a diagram illustrating an example of the display method according to the first embodiment.

When, for example, the user lies on from the posture of sitting while looking at the display unit 20 of the display device 100, the face angle between the user and the display unit 20 changes in some cases. When the face angle of the user that is detected by the face angle detector 41 exceeds a threshold, the display controller 43 adjusts the angle of display of the subject of display. As illustrated in FIG. 4, the display controller 43 is able to set a center part of the image information P of the subject-of-display 21 for the reference position, cause the subject of display on the reference position by 90°, and display the image information P in an enlarged manner. The display controller 43 is not limited to a configuration in which an angle of rotation is 90° when the angle of display of the subject of display is adjusted and it may be an angle different from 90°, such as 30°, 60°, or 120°.

Figure 5:
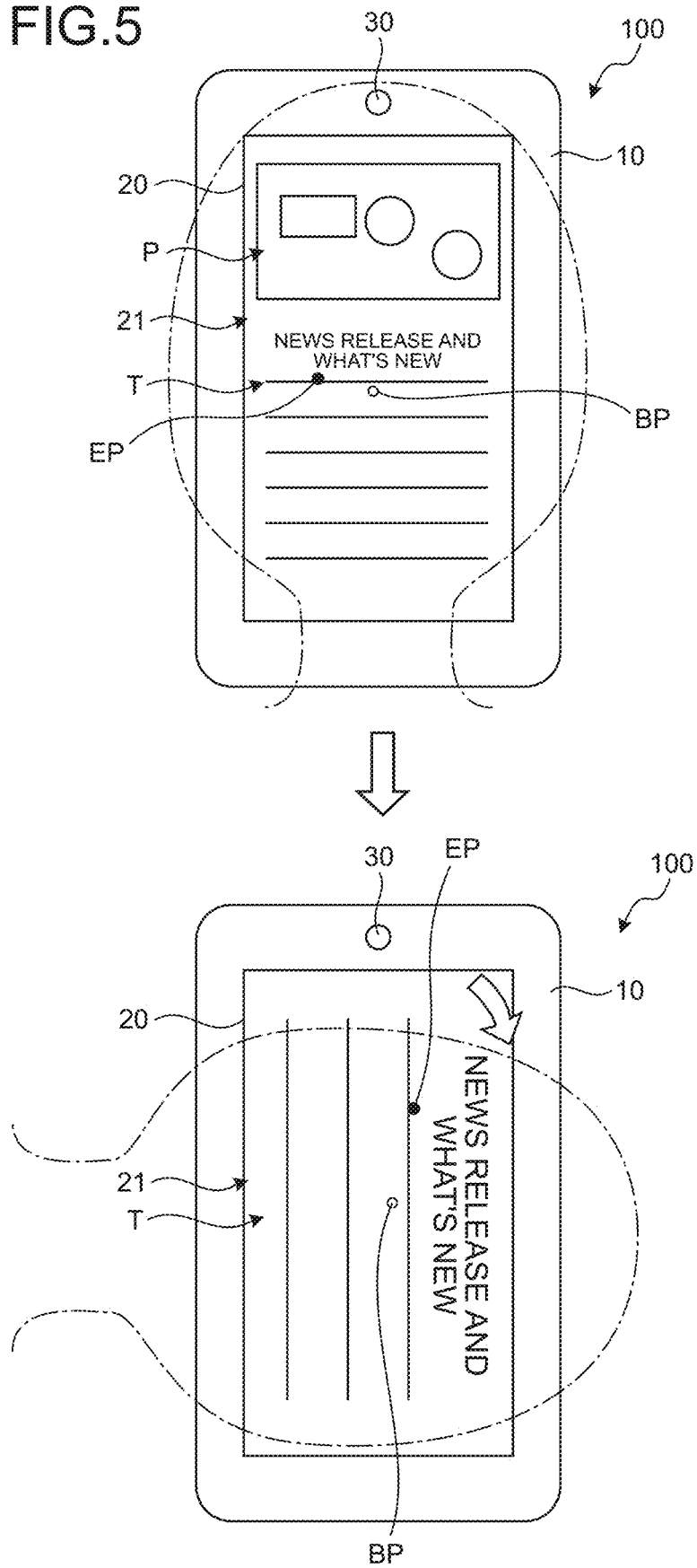
FIG. 5 is a diagram illustrating an example of the display method according to the first embodiment.

When the subject-of-display 21 contains the text information T, the display controller 43 may perform the following process. In other words, the display controller 43 determines whether the subject of display contains the text information T and, when it is determined that it contains the text information T, determines whether a gaze EP of the user is present on a part of display of the text information. When it is determined that the gaze EP of the user is present on the part of display of the text information, the display controller 43 is able to set, for a reference position BP, a center of the text information on which the gaze EP is present in the row direction and rotate the subject-of-display 21 as illustrated in FIG. 5. When the text information is displayed in multiple rows, the display controller 43 may set the reference position BP in a position that is shifted to a side of the next row with respect to the row in which the gaze EP is present. In this case, rotating the subject-of-display 21 makes it possible to display more text information that the user is going to read. The display controller 43 may set the reference position BP such that the reference positon BP matches the gaze EP. Regardless whether the subject-of-display 21 contains the text information T, the display controller 43 may set, for the reference position, the position in which the gaze of the user is present on the display unit 20 when rotating the subject-of-display 21.

Figure 6:
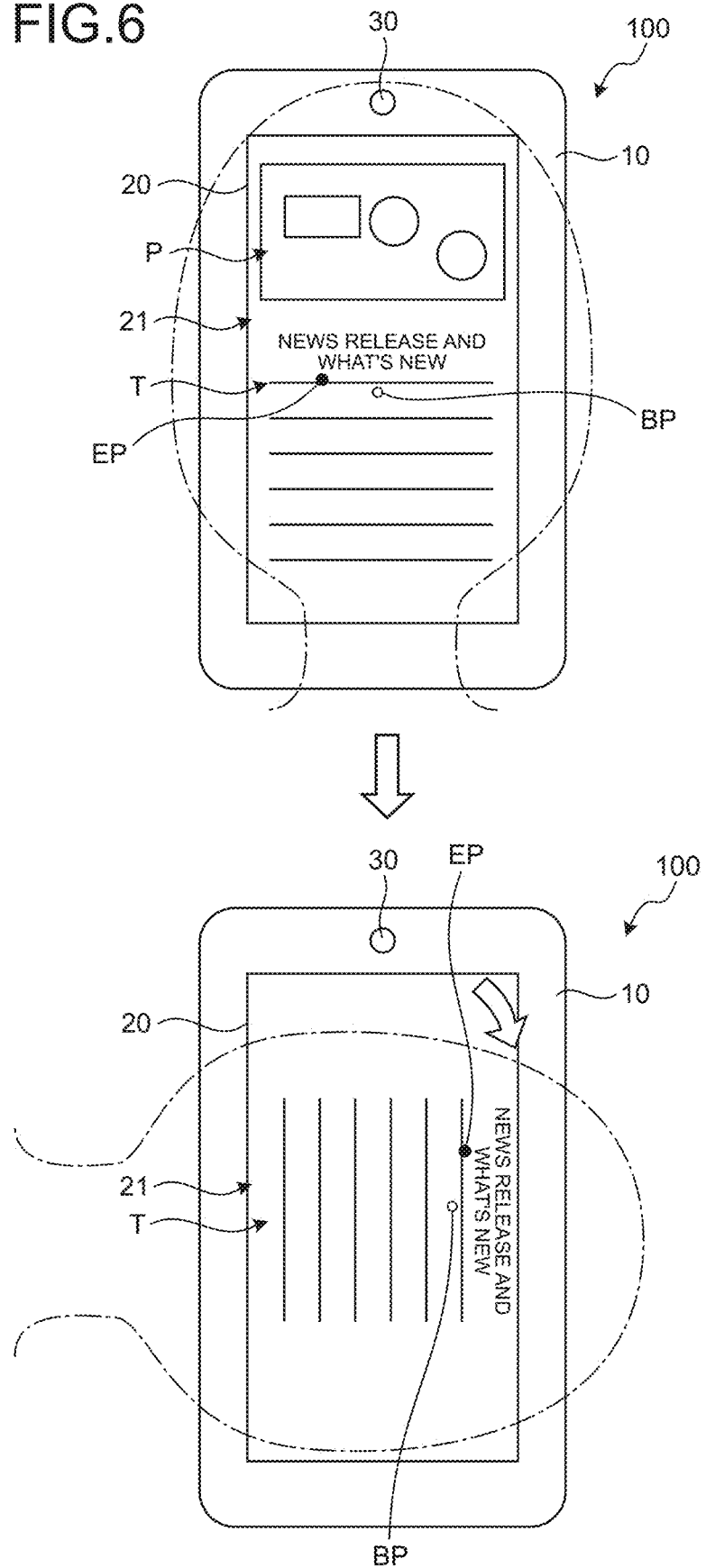
FIG. 6 is a diagram illustrating an example of the display method according to the first embodiment.

When rotating the subject-of-display 21, the display controller 43 may adjust the size of the subject-of-display 21 so that the text information T that is displayed on the display unit 20 right before the rotation is all displayed as illustrated in FIG. 6. In this case, the reference position BP that is set for the rotation need not be arranged at the center of the display unit 20.

Figure 7:
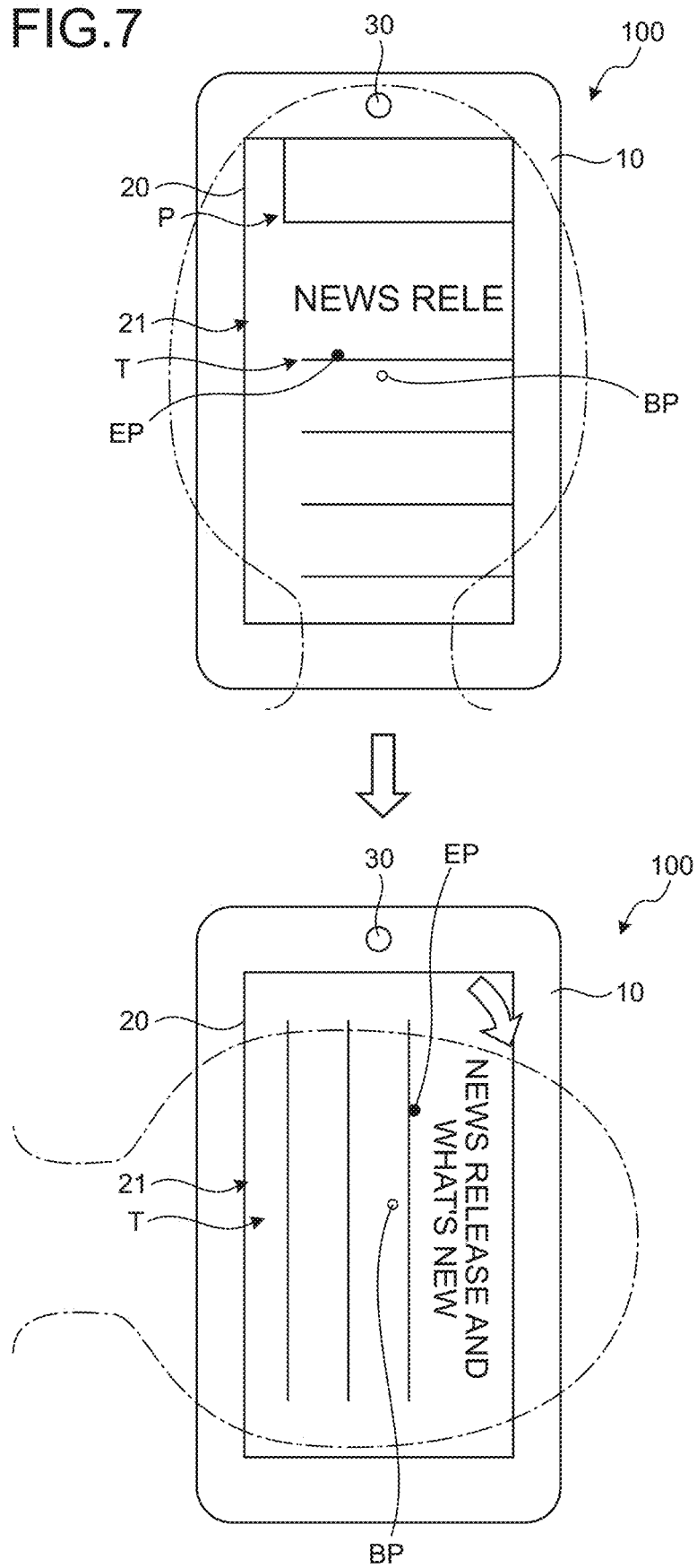
FIG. 7 is a diagram illustrating an example of the display method according to the first embodiment.

When rotating the subject-of-display 21, the display controller 43 determines whether part of the text information T is displayed in an enlarged manner on the display unit 20 as illustrated in FIG. 7 right before the rotation. When it is determined that part of the text information T is displayed in an enlarged manner on the display unit 20, the display controller 43 may adjust the size of the subject-of-display 21 such that the whole text information T in the row direction is displayed.

Figure 8:
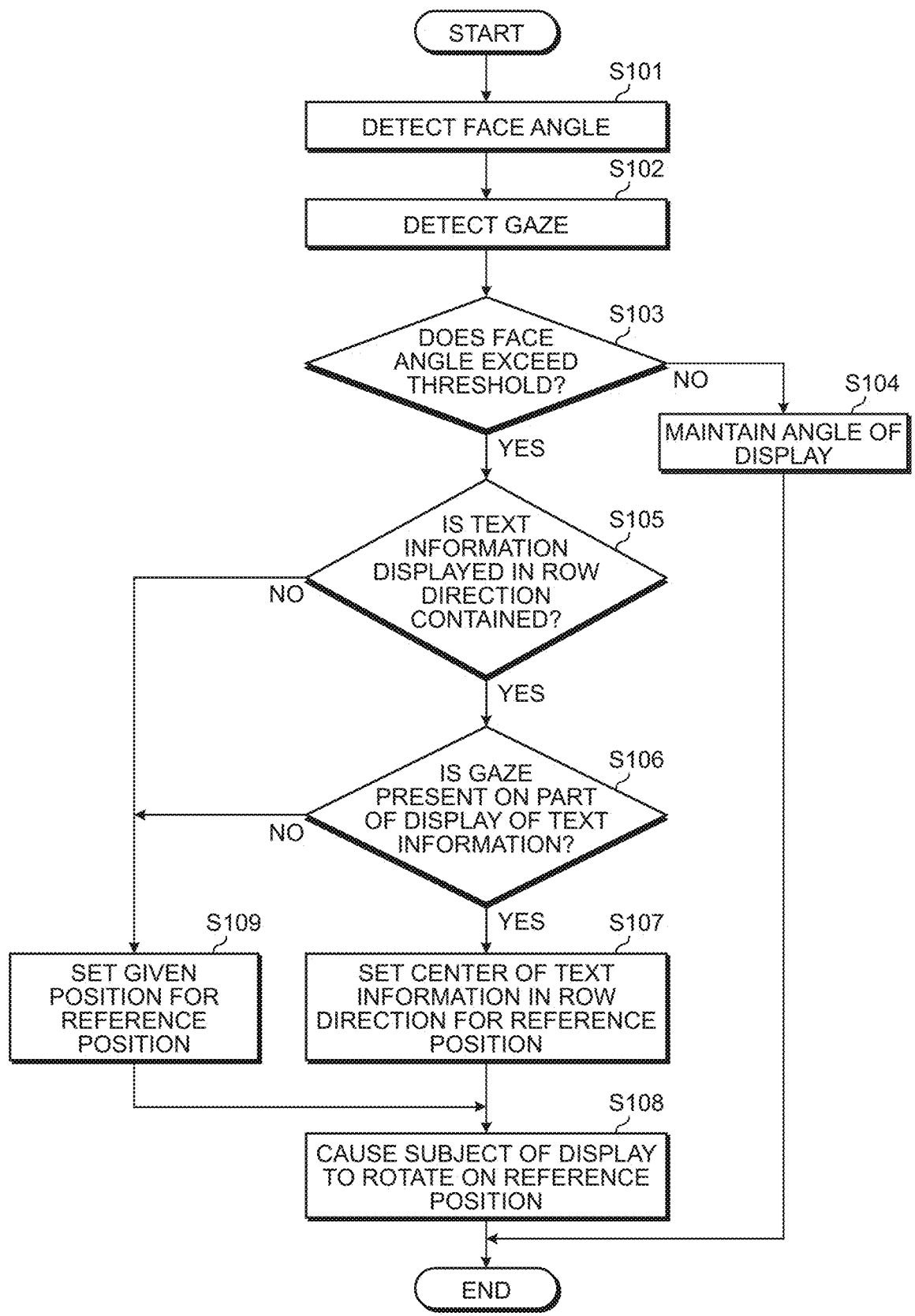
FIG. 8 is a flowchart illustrating a flow of operations of the display device according to the first embodiment.

FIG. 8 is a flowchart illustrating a flow of operations of the display device 100 according to the first embodiment. As illustrated in FIG. 8, in the state where the subject of display is being displayed on the display unit 20, the face angle detector 41 detects a face angle between the display unit 20 and the face of the user (step S101). Furthermore, the gaze detector 42 detects a gaze of the user (step S102).

The display controller 43 determines whether the face angle exceeds the threshold (step S103) and, when it is determined that it does not exceed the threshold (No at step S103), maintains an angle of display of the subject of display (step S104).

On the other hand, when it is determined that it exceeds the threshold (Yes at step S103), the display controller 43 determines whether the subject of display contains text information that is displayed in the row direction (step S105). When it is determined that it contains text information that is displayed in the row direction (Yes at step S105), the display controller 43 determines whether the gaze of the user is present in a part of display of the text information (step S106). When it is determined that the gaze of the user is present in the part of display of the text information (Yes at step S106), the display controller 43 sets, for a reference position, the center of the text information on which the gaze is present (step S107). When it is determined that it does not contain text information that is displayed in the row direction at step S105 (Yes at step S105), or when it is determined that the gaze of the user is not present in the part of display of the text information (No at step S106), the display controller 43 sets a given position for a reference position (step S109). After setting the reference position, the display controller 43 rotates the subject of display on the reference position (step S108).

As described above, the display device 100 according to the present embodiment includes the display unit 20, the face angle detector 41 that detects a face angle that is an angle between the display unit 20 and the face of a user, the gaze detector 42 that detects a gaze of the user, and the display controller 43 that adjusts an angle of display of a subject of display by rotating the subject of display on a reference position on the display unit 20 according to a result of detecting the face angle and, when the gaze of the user is detected on the display unit 20, sets a position corresponding to the gaze for the reference position.

The display method according to the present embodiment includes detecting a face angle that is an angle between the display unit 20 and the face of a user, detecting a gaze of the user, and adjusting an angle of display of a subject of display by rotating the subject of display on a reference position on the display unit 20 according to a result of detecting the face angle and, when the gaze of the user is detected on the display unit 20, setting a position corresponding to the gaze for the reference position.

According to this configuration, in the case where the subject of display on the display unit 20 is rotated, when the gaze of the user is detected on the display unit 20, a position corresponding to the gaze is set for the reference positon and the subject of display is rotated. Accordingly, it is possible to display a part that the user was looking at right before the rotation in an appropriate position.

In the display device 100 according to the present embodiment, the display controller 43 determines whether the subject of display contains text information that is displayed in a row direction, when it is determined that it contains the text information that is displayed in the row direction, determines whether the gaze of the user is present in a part of display of the text information, and, when it is determined that the gaze of the user is present in the part of display of the text information, sets, for the reference position, a center of the text information on which the gaze is present in the row direction. According to this configuration, it is possible to display a part of the text information that the user was looking at right before the rotation in an appropriate position.

In the display device 100 according to the present embodiment, the display controller 43 adjusts a size of the subject of display so that the text information that is displayed on the display unit 20 right before the rotation is all displayed, and rotates the subject of display. According to the configuration, it is possible to reduce uncomfortableness to the user who was looking at the text information before and after the rotation.

In the display device 100 according to the present embodiment, when part of the text information is displayed in an enlarged manner on the display unit 20 right before rotation, the display controller 43 may adjust the size of the subject of display such that the whole text information in the row direction is displayed. According to the configuration, it is possible to allow the user to sense the whole text information containing the part the user was looking at right before the rotation in the row direction.

Second Embodiment

Figure 9:
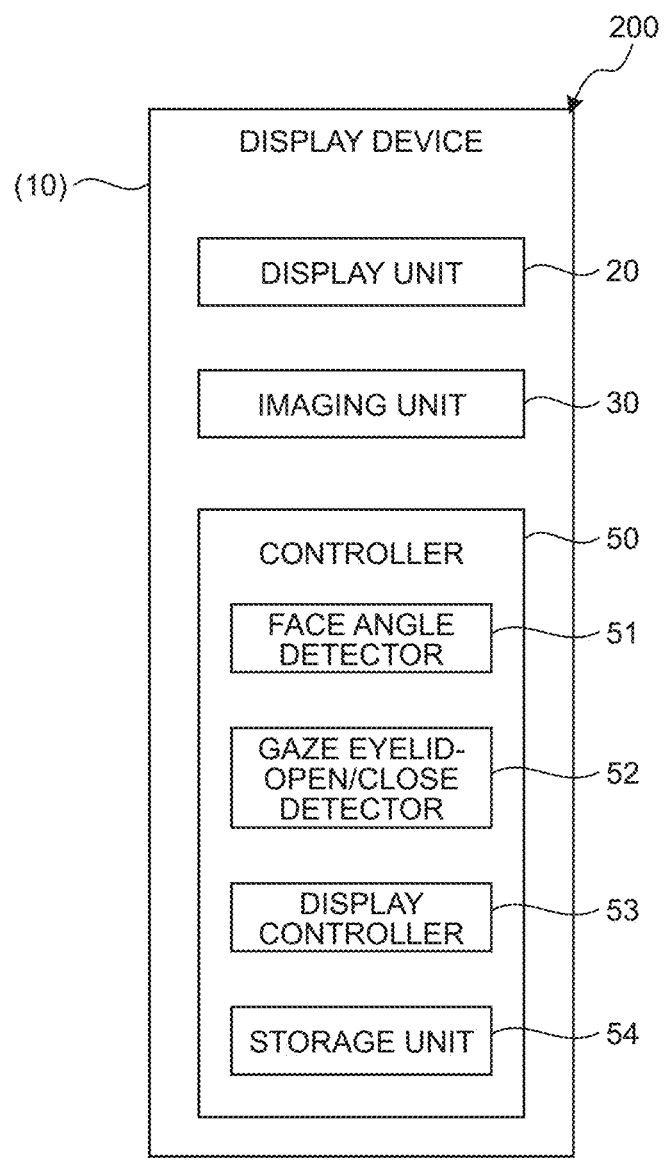
FIG. 9 is a functional block diagram illustrating an example of a display device according to a second embodiment.

FIG. 9 is a functional block diagram illustrating an example of a display device 200 according to a second embodiment. As illustrated in FIG. 9, the display device 200 includes the casing 10, the display unit 20, the imaging unit 30, and a controller 50. The configurations of the casing 10, the display unit 20, and the imaging unit 30 are the same as those of the display device 100 according to the first embodiment.

In the present embodiment, the configuration of the controller 50 is different from that of the controller 40 of the display device 100 in the first embodiment. The difference will be described mainly below. The controller 50 includes a face angle detector 51, a gaze eyelid-open/close detector 52, a display controller 53, and a storage unit 54. The face angle detector 51 is the same as the face angle detector 41 of the first embodiment.

Based on imaging data that is generated by the imaging unit 30, the gaze eyelid-open/close detector 52 detects at least one of a gaze and an eyelid open/close motion of a user. The gaze eyelid-open/close detector 52, for example, may be configured to detect a gaze based on a position of an iris of the user and a positon of a corneal reflection image or may be configured to detect a gaze based on a position of an inner corner of an eye of the user and a positon of an iris. The gaze eyelid-open/close detector 52 is able to detect a motion of an eyelid of the user based on image processing.

The display controller 53 controls a display operation in the display unit 20. As in the first embodiment, the display controller 53 adjusts an angle of display of a subject of display by rotating the subject of display on a reference position on the display unit 20 according to a result of detecting a face angle. The display controller 53 determines whether the user is in a given not-viewing state based on at least one of a gaze and an eyelid open/close motion of the user and, when it is determined that it is in the not-viewing state, does not rotate the subject of display. In the present embodiment, the not-viewing state includes at least one of a state in which the user has his/her eyelids closed and a state in which the gaze of the user is not present on the display unit 20. For example, when the gaze eyelid-open/close detector 52 detects that the user has his/her eyelids closed, the display controller 53 is able to determine that the user is in the not-viewing state. For example, when the gaze eyelid-open/close detector 52 detects the gaze of the user in a direction deviating from the display unit 20, the display controller 53 is able to determine that that user is in the not-viewing state. When it is detected that the not-viewing state ends, the display controller 53 adjusts an angle of display of the subject of display based on a face angle at the time when the not-viewing state ends.

The display controller 53 is able to make at least one of a setting for an initial value of the angle of display of the subject of display and a change in the setting according to a period during which the user has his/her eyelids closed. The initial value of the angle of display is an angle of display of the subject of display that is displayed initially at the time when the operation of the display device 200 is started or restarted.

The display controller 53 is able to change a mode of display on the display unit 20 based on at least one of the gaze and the eyelid open/close motion of the user. For example, the position of the gaze on the display unit 20, a displacement, etc., are listed as the gaze of the user. For example, the period during which the user has his/her eyelids closed, the number of blinks, etc., are listed as the eyelid open/close motion of the user. In the case where the display device 200 is additionally provided with another component, such as a sensor capable of detecting a walk of the user, or the like, by detecting an acceleration, or the like, the display controller 53 is able to change the mode of display by combining another component, such as the sensor, and at least one of the gaze and the eyelid open/close motion of the user.

The storage unit 54 stores various types of information. The storage unit 54, for example, has a storage, such as a hard disk drive or a solid state drive. An external storage medium, such as a removable disk, may be used as the storage unit 54.

The storage unit 54 stores a display program that causes a computer to execute a process of detecting a face angle that is an angle between the display unit 20 and the face of a user, a process of detecting a gaze of the user, and a process of adjusting an angle of display of a subject of display by rotating the subject of display on a reference position on the display unit 20 according to a result of detecting the face angle. The storage unit 54 stores a display program that causes a computer to execute a process of detecting a face angle that is an angle between the display unit 20 and the face of a user, a process of detecting at least one of a gaze and an eyelid open/close motion of the user, and a process of adjusting an angle of display of a subject of display by rotating the subject of display on a reference position on the display unit 20 according to a result of detecting the face angle, determining whether the user is in a given not-viewing state based on at least one of the gaze and an eyelid open/close motion of the user and, when it is determined that it is in the not-viewing state, not rotating the subject of display.

An example of a display method in the display device 200 described above will be described next. FIGS. 10 to 12 are diagrams illustrating an example of the display method according to the second embodiment. The display controller 53 displays the subject-of-display 21 on the display unit 20. The user is able to view the subject-of-display 21 that is displayed on the display unit 20.

The imaging unit 30 captures an image of the face and the eyes of the user who looks at the display unit 20. The imaging unit 30 generates imaging data obtained by capturing the face and the eyes of the user and transmits the imaging data to the controller 50. In the controller 50, the face angle detector 51 detects a face angle of the user based on the imaging data. The gaze eyelid-open/close detector 52 detects a gaze or the eyelid open/close motion of the user based on the imaging data.

When the face angle of the user that is detected by the face angle detector 51 exceeds a threshold, the display controller 53 adjusts the angle of display of the subject of display. When the face angle changes, the display controller 53 determines whether the user is in the not-viewing state. When it is detected that the user has his/her eyelids opened and when it is detected that the gaze of the user is present on the display unit 20, the display controller 53 determines that the use is not in the not-viewing state. In this case, the display controller 53 adjusts the angle of display by rotating the subject-of-display 21 displayed on the display unit 20 as illustrated in FIG. 10.

On the other hand, when it is detected that the user has his/her eyelids closed, or when it is detected that the gaze of the user is not present on the display unit 20, the display controller 53 determines that the user is in the not-viewing state. In this case, the display controller 53 prevents the subject-of-display 21 displayed on the display unit 20 from rotating as illustrated in FIG. 11. Thereafter, when it is detected that the user opens the eyelids late and when it is detected that the gaze of the user is present on the display unit 20, the display controller 53 determines that the not-viewing state of the user ends. In this case, as illustrated in FIG. 12, based on the face angle at the time when it is determined that the not-viewing state ends, the display controller 53 adjusts the angle of display of the subject-of-display 21 displayed on the display unit 20.

FIG. 13 is a diagram illustrating an example of a relationship between a subject of detection that is the gaze and the eyelid open/close motion of the user and content of control on the display in the case where the subject of detection is detected. As illustrated in FIG. 13, the display controller 53 is able to make at least one of a setting for an initial value of the angle of display of the subject of display and a change in the setting according to a period during which the user has his/her eyelids closed. When a motion of opening the eyelids after closing the eyelids for a first period (for example, 1 second) by the user is detected, the display controller 53 is able to set an angle of display of the subject of display at the time when the user has the eyelids opened for an initial value of the angle of display on the display unit 20. After the user sets the initial value of the angle of display, when a motion of opening the eyelids is detected after the eyelids are closed for a second period (for example, two seconds), the display controller 53 is able to cancel the setting of the initial value of the angle of display.

As illustrated in FIG. 13, based on at least one of the gaze and the eyelid open/close motion of the user, the display controller 53 is able to change the mode of display of the display unit 20. For example, when the gaze of the user is detected on an upper part of the display unit 20 and a blink motion is detected for a first number of times (for example, twice), the display controller 53 is able to scroll up the subject of display by half the screen of the display unit 20. When the gaze of the user is detected on a lower part of the display unit 20 and the blink motion is detected for the first number of times (for example, twice), the display controller 53 is able to scroll down the subject of display by half the screen of the display unit 20.

As illustrated in FIG. 13, in the case where the gaze of the user is detected on the upper part or the lower part of the display unit 20, when the blink motion is detected for a second number of times (for example, third times) more than the first number of times, the display controller 53 is able to scroll up or down the subject of display by one screen of the display unit 20 in each case. As described above, the display controller 53 is able to set a direction in which the subject of display is scrolled based on the positon of the gaze on the display unit 20 and set an amount of scrolling based on the number of blinks.

As illustrated in FIG. 13, in the case where the gaze of the user is detected on the upper part or the lower part of the display unit 20, when the blink motion is detected for the aforementioned given number of times (for example, twice), the display controller 53 may make a smooth scroll up or down of the subject of display. When it is detected that the user closes the eyelids for a given period (for example, 1 second) in the middle of the smooth scroll, the display controller 53 may stop the scroll.

As illustrated in FIG. 13, the display controller 53 may determine whether text information is contained in the subject of display and, when it is determined that text information is contained, scroll the subject of display in accordance with an action of reading the text information line by line by the user. For example, when the gaze of the user shifts from a line to the next line, the display controller 53 may scroll the subject of display in accordance with the shift of the gaze of the user with respect to a column direction orthogonal to the row direction.

As illustrated in FIG. 13, the display controller 53 is able to detect the number of blinks by the user and a length of time of a blink and, when the number of blinks per unit of time exceeds a threshold or the length of time per blink is longer than a given threshold, determine that the eyes of the user fatigue. When it is determined that the eyes of the user fatigue, the display controller 53 is able to adjust illumination of the display unit 20. For example, when the given threshold is exceeded or it is longer than the given threshold, the display controller 53 is able to reduce the luminance of the display unit 20 and, when it returns to be at or smaller than the given threshold, return the luminance of the display unit 20 to the original luminance, thereby adjusting on the luminance.

As illustrated in FIG. 13, in the case where a sensor capable of detecting a walk of the user, or the like, by detecting vibrations of the casing 10, an acceleration, or the like, is provided additionally, when a walk by the user is detected, the display controller 53 is able to determine whether the gaze of the user is present on the display unit 20. In the case where it is determined that the gaze of the user is present on the display unit 20 when a walk by the user is detected, the display controller 53 is able to display alert information on looking at the display unit 20 while walking and turn off the display of the display unit 20.

Figure 14:
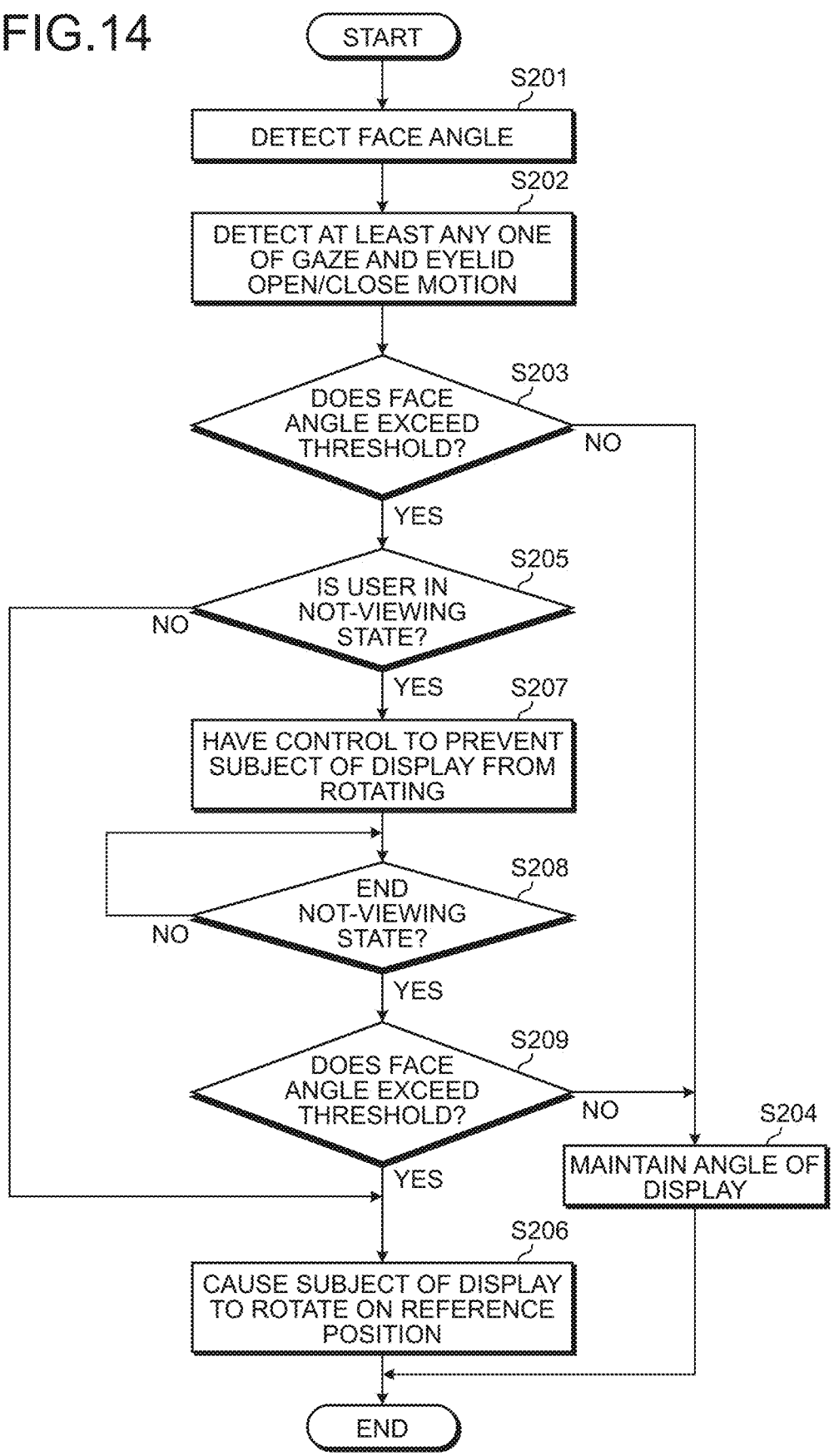
FIG. 14 is a flowchart illustrating a flow of operations of the display device according to a second embodiment.

FIG. 14 is a flowchart illustrating a flow of operations of the display device 100. As illustrated in FIG. 14, in the state where the subject of display is being displayed on the display unit 20, the face angle detector 51 detects a face angle between the display unit 20 and the face of a user (step S201). The gaze eyelid-open/close detector 52 detects at least one of a gaze and an eyelid open/close motion of the user (step S202).

The display controller 53 determines whether the face angle exceeds the threshold (step S203) and, when it is determined that it does not exceed the threshold (No at step S203), maintains an angle of display of the subject of display (step S204).

On the other hand, when it is determined that it exceeds the threshold (Yes at step S203), the display controller 53 determines whether the user is in the given not-viewing state (step S205). When it is determined that the user is not in the given not-viewing state (No at step S205), the subject of display is rotated on a reference position and thereby the angle of display of the subject of display is adjusted (step S206).

When it is determined that the user is in the given not-viewing state (Yes at step S205), the display controller 53 prevents the subject of display from rotating (step S207). Thereafter, it is determined whether the not-viewing state of the user ends (step S208) and, when it is determined that the not-viewing state does not end (No at step S208), the operation at step S208 is performed repeatedly and thereby the state where the subject of display is prevented from rotating is maintained. When it is determined that the not-viewing state ends (Yes at step S208), the display controller 53 adjusts the angle of display of the subject of display based on the face angle at the time of the determination. In other words, the display controller 53 determines whether the face angle exceeds the threshold at the time of the determination (step S209) and, when it is determined that it does not exceed the threshold (No at step S209), maintains the angle of display of the subject of display (step S204). On the other hand, when it is determined that it exceeds the threshold (Yes at step S209), the subject of display is rotated on the reference position and thereby the angle of display of the subject of display is adjusted (step S206).

As described above, the display device 200 according to the present embodiment includes the display unit 20, the face angle detector 51 that detects a face angle that is an angle between the display unit 20 and the face of a user, the gaze eyelid-open/close detector 52 that detects at least one of a gaze and an eyelid open/close motion of the user, and the display controller 53 that adjusts an angle of display of a subject of display by rotating the subject of display on a reference position on the display unit 20 according to a result of detecting the face angle, determines whether the user is in the given not-viewing state based on at least one of the gaze and the eyelid open/close motion of the user and, when it is determined that it is in the given not-viewing state, prevents the subject of display from rotating.

The display method according to the present embodiment includes detecting a face angle that is an angle between the display unit 20 and the face of a user, detecting at least one of a gaze and an eyelid open/close motion of the user, and adjusting an angle of display of a subject of display by rotating the subject of display on a reference position on the display unit 20 according to a result of detecting the face angle, determining whether the user is in the given not-viewing state based on at least one of the gaze and the eyelid open/close motion of the user and, when it is determined that it is in the given not-viewing state, preventing the subject of display from rotating.

According to this configuration, in the case where it is determined that the user is in the not-viewing state, the subject of display does not rotate. Accordingly, it is possible to reduce uncomfortableness given to the user when the subject of display on the display unit 20 is rotated.

In the display device 200 according to the present embodiment, when it is detected that the not-viewing state ends, the display controller 53 adjusts the angle of display of the subject of display based on the face angle at the time when the not-viewing state ends. According to this configuration, when the not-viewing state ends, because the angle of display of the subject of display is adjusted according to the face angle at that time, it is possible to appropriately set the angle of display of the subject of display at timing when the user looks at the display unit 20.

In the display device 200 according to the present embodiment, the gaze eyelid-open/close detector 52 detects the eyelid open/close motion of the user and the display controller 53 makes at least one of a setting for an initial value of the angle of display of the subject of display and a change in the setting according to a period during which the user has his/her eyelids closed. According to this configuration, it is possible to make a setting for an initial value of the angle of display of the subject of display and a change in the setting by a simple operation.

In the display device 200 according to the present embodiment, the gaze eyelid-open/close detector 52 detects both the gaze and the eyelid open/close motion of the user and the display controller 53 changes the mode of display of the display unit 20 based on at least one of the gaze and the eyelid open/close motion of the user. According to this configuration, it is possible to appropriately change the mode of display of the display unit 20 by a simple operation.

As described above, according to the mode of the present disclosure, the display device 100, 200 including the display unit 20, the face angle detector 41, 51 that detects a face angle that is an angle between the display unit 20 and the face of a user, and the display controller 43, 54 that adjusts an angle of display of a subject of display by rotating the subject of display on a reference position on the display unit 20 according to a result of detecting the face angle is provided.

According to the mode of the present disclosure, a display method including detecting a face angle that is an angle between the display unit 20 and the face of a user, detecting a gaze of the user, and adjusting an angle of display of a subject of display by rotating the subject of display on a reference position on the display unit 20 according to a result of detecting the face angle is provided.

According to the mode of the present disclosure, a display program that causes a computer to execute a process of detecting a face angle that is an angle between the display unit 20 and the face of a user, a process of detecting a gaze of the user, and a process of adjusting an angle of display of a subject of display by rotating the subject of display on a reference position on the display unit 20 according to a result of detecting the face angle is provided.

According to the mode of the disclosure, because the face angle that is the angle between the display unit 20 and the face of the user is detected and the angle of display of the subject of display is adjusted by rotating the subject of display on the reference position on the display unit 20 according to the result of detecting the face angle, it is possible to appropriately perform the operation of rotating the subject-of-display 21 displayed on the display unit 20 according to the face angle.

The technical field of the disclosure is not limited to the above-described embodiments and it is possible to add changes without departing from the scope of the present disclosure. For example, in the above-described embodiment, the configuration in which the imaging unit us provided in the casing 10 is exemplified and described; however, the configuration is not limited to this. The imaging unit 30 may be provided independently of the casing 10, that is, the display device 100, 200.

The display program described above may be provided by being stored in a non-transitory computer-readable storage medium, or may be provided via a network such as the Internet. Examples of the computer-readable storage medium include optical discs such as a digital versatile disc (DVD) and a compact disc (CD), and other types of storage devices such as a hard disk and a semiconductor memory.

According to the disclosure, it is possible to perform the operation of rotating a subject of display that is displayed on the display unit.

It is possible to use the display device, the display method, and the display program according to the disclosure for, for example, a processing device, such as a computer, etc.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
   a display unit;
   a face angle detector configured to detect a face angle that is an angle between the display unit and a face of a user;
   a gaze detector configured to detect a gaze of the user; and
   a display controller configured to
     adjust an angle of display of a subject of display by rotating the subject of display on a reference position on the display unit according to a result of detecting the face angle, and
     when the gaze of the user is detected on the display unit, set a position corresponding to the gaze for the reference position.

2. The display device according to claim 1, wherein the display controller is configured to
   determine whether the subject of display contains text information that is displayed in a row direction,
   when the subject of display is determined to contain the text information displayed in the row direction, determine whether the gaze of the user is present in a part of display of the text information, and
   when the gaze of the user is determined to be present in the part of display of the text information, set a center of the text information on which the gaze is present in the row direction for the reference position.

3. The display device according to claim 2, wherein the display controller is configured to adjust a size of the subject of display so that the text information that is displayed on the display unit right before rotation is all displayed, and rotate the subject of display.

4. The display device according to claim 2, wherein, when part of the text information is displayed in an enlarged manner on the display unit right before rotation, the display controller is configured to adjust the size of the subject of display so that the whole text information in the row direction is displayed, and rotate the subject of display.

5. The display device according to claim 1, further comprising a gaze eyelid-open/close detector configured to detect at least one of a gaze and an eyelid open/close motion of the user,
wherein the display controller is configured to
determine whether the user is in a not-viewing state based on at least one of the gaze and the eyelid open/close motion of the user, and
when the user is determined to be in the not-viewing state, prevent the subject of display form rotating.

6. The display device according to claim 5, wherein, when the not-viewing state is detected to have ended, the display controller is configured to adjust the angle of display of the subject of display based on the face angle at a time when the not-viewing state ended.

7. The display device according to claim 5, wherein
the gaze eyelid-open/close detector is configured to detect the eyelid open/close motion of the user, and
the display controller is configured to make at least one of a setting for an initial value of the angle of display of the subject of display and a change in the setting according to a period during which the user has eyelids closed.

8. The display device according to claim 5, wherein
the gaze eyelid-open/close detector is configured to detect both the gaze and the eyelid open/close motion of the user, and
the display controller is configured to change a mode of display of the display unit based on at least one of the gaze and the eyelid open/close motion of the user.

9. A display method comprising:
detecting a face angle that is an angle between a display unit and a face of a user;
detecting a gaze of the user;
adjusting an angle of display of a subject of display by rotating the subject of display on a reference position on the display unit according to a result of detecting the face angle; and
when the gaze of the user is detected on the display unit, setting a position corresponding to the gaze for the reference position.

10. A non-transitory computer-readable storage medium storing a display program causing a computer to execute:
detecting a face angle that is an angle between a display unit and a face of a user;
detecting a gaze of the user;
adjusting an angle of display of a subject of display by rotating the subject of display on a reference position on the display unit according to a result of detecting the face angle; and
when the gaze of the user is detected on the display unit, setting a position corresponding to the gaze for the reference position.

\* \* \* \* \*